(12) United States Patent
Bicker et al.

(10) Patent No.: US 10,155,676 B2
(45) Date of Patent: Dec. 18, 2018

(54) PROCESS FOR EXTRACTING A SURFACTANT USING A BORONIC ACID MODIFIED MATERIAL

(71) Applicants: Kevin L Bicker, Murfreesboro, TN (US); Robert William Tilford, Stone Mountain, GA (US)

(72) Inventors: Kevin L Bicker, Murfreesboro, TN (US); Robert William Tilford, Stone Mountain, GA (US)

( * ) Notice: Subject to any disclaimer, the term of this patent is extended or adjusted under 35 U.S.C. 154(b) by 0 days.

(21) Appl. No.: 15/248,236

(22) Filed: Aug. 26, 2016

(65) Prior Publication Data

US 2017/0057840 A1    Mar. 2, 2017

Related U.S. Application Data

(60) Provisional application No. 62/210,550, filed on Aug. 27, 2015.

(51) Int. Cl.
| | | |
|---|---|---|
| *B01D 15/00* | (2006.01) | |
| *C02F 1/42* | (2006.01) | |
| *B01J 49/00* | (2017.01) | |
| *C02F 1/28* | (2006.01) | |
| *C02F 1/66* | (2006.01) | |
| *C02F 101/30* | (2006.01) | |

(52) U.S. Cl.
CPC ............ *C02F 1/288* (2013.01); *C02F 1/281* (2013.01); *C02F 1/285* (2013.01); *C02F 1/66* (2013.01); *C02F 2101/301* (2013.01); *C02F 2305/00* (2013.01)

(58) Field of Classification Search
None
See application file for complete search history.

(56) References Cited

U.S. PATENT DOCUMENTS

| | | | | |
|---|---|---|---|---|
| 1,784,884 | A * | 12/1930 | Smith | B60Q 1/444 |
| | | | | 340/479 |
| 4,909,662 | A * | 3/1990 | Baker | E01C 7/145 |
| | | | | 264/31 |
| 5,846,434 | A * | 12/1998 | Seaman | C02F 1/547 |
| | | | | 210/724 |
| 6,527,051 | B1 * | 3/2003 | Reddy | B01J 13/22 |
| | | | | 166/300 |
| 9,243,207 | B2 * | 1/2016 | Domaille | C12M 47/10 |
| 2007/0093399 | A1 * | 4/2007 | Hamilton | B01D 15/203 |
| | | | | 510/137 |
| 2016/0368786 | A1 * | 12/2016 | Needham | B01D 15/02 |
| 2017/0057840 | A1 * | 3/2017 | Bicker | C02F 1/288 |

OTHER PUBLICATIONS

Bull, S. D.; Davidson, M. G.; van den Elsen, J. M. H.; Fossey, J. S.; Jenkins, A. T. A.; Jiang, -Y.-B.; Kubo, Y.; Marken, F.; Sakurai, K.; Zhao, J.; James, T. D.; Exploiting the Reversible Covalent Bonding of Boronic Acids: Recognition, Sensing, and Assembly; Accounts of Chemical Research, vol. 46, No. 2, 312-326 (2013); American Chemical Society.

(Continued)

*Primary Examiner* — Ana Fortuna
(74) *Attorney, Agent, or Firm* — Wayne Edward Ramage; Baker Donelson (57) ABSTRACT

A process for extracting a surfactant from a mixture using a boronic acid modified material.

14 Claims, 8 Drawing Sheets

Utilization of SR-16 to break the emulsion and isolate the surfactant from an oil-in-water emulsion stabilized by a commercial emulsifier formulation containing three surfactants in equal portions (PG4 Laurate, Sorbitan Laurate, and Dilauryl Citrate).

(56) References Cited

OTHER PUBLICATIONS

Cheryan, M., Ultrafiltration and Microfiltration Handbook, CRC Press: 1998.

Guo, Z.; Shin, I.; Yoon, J., Recognition and Sensing of Various Species Using Boronic Acid Derivatives, Chemical Communications 2012, 48, 5956-5967; Royal Society of Chemistry.

Kowalska, I.; Majewska-Nowak, K.; Kabsch-Korbutowicz, M.; Ultrafiltration Treatment of Detergent Solutions, Desalination 200 (2006) 274-276; Elsevier B.V.

Lee, C.; Russell, N.; White, G.; Modeling the Kinetics of Biodegradation of Anionic Surfactants by Biofilm Bacteria from Polluted Riverine Sites: A Comparison of Five Classes of Surfactant at Three Sites, Water Research, vol. 29, No. 11, pp. 2491-2497 (1995); Elseiver Science Ltd.

Li, D.; Chen, Y.; Liu, Z., Boronate Affinity Materials for Separation and Molecular Recognition: Structure, Properties, and Applications, Chemical Society Reviews, 2015, 44, 8097.

Li, S.; Heijman, S.; Verberk, J.; Verliefde, A.; Kemperman, A.; Dijk, J.; Amy, G.; Impact of Backwash Water Composition on Ultrafiltration Fouling Control; J. Membrane Sci. 344 (2009) 17-25; Elsevier B.V.

Mallia, A. K.; Hermanson, G. T.; Krohn, R. I.; Fujimoto, E. K.; Smith, P. K., Preparation and Use of a Boronic Acid Affinity Support for Separation and Quantitation of Glycosylated Hemoglobins, Analytical Letters, 14, (B8), 649-661 (1981); Marcel Dekker, Inc.

Scott, M.; Jones, M.; The Biodegradation of Surfactants in the Environment, Biochem. Biophys. Acta. Biomembranes 2000, 1-2, 235-251; Elsevier Science B.V.

Yu, Y.; Addai-Mensah, J.; Losic, D.; Functionalized Diatom Silica Microparticles for the Removal of Mercury Ions; Sci. Technol. Adv. Mater. 13 (2012) 015008; National Institute for Materials Science.

\* cited by examiner

FIG. 1

Synthesis of boronic acid modified silicon dioxide surfactant capture material. The material is amino functionalized by treating with 3-aminopropytriethoxysilane. The boronic acid is then installed through reductive amination with 2-formylphenyl boronic acid and sodium borohydride.

FIG. 2

Synthesis of boronic acid modified cross-linked polystyrene surfactant capture material. The boronic acid is installed through reductive amination with 2-formylphenyl boronic acid and sodium borohydride.

Unmodified Celite does not bind and capture diol containing surfactant, confirming the importance of the boronic acid in binding to the diol containing surfactant.

FIG. 6

Utilization of SR-16 to break the emulsion and isolate the surfactant from an oil-in-water emulsion stabilized by a commercial emulsifier formulation containing three surfactants in equal portions (PG4 Laurate, Sorbitan Laurate, and Dilauryl Citrate).

FIG. 7

Resin binding of diol-containing surfactants PG4 Laurate, Sorbitan Laurate, and the alpha-hydroxy acid, Dilauryl Citrate.

FIG. 8

Synthesis of N-lauryldopamine, a catechol containing surfactant, from dopamine and lauric acid.

PROCESS FOR EXTRACTING A SURFACTANT USING A BORONIC ACID MODIFIED MATERIAL

CROSS REFERENCE TO RELATED APPLICATIONS

This non-provisional application is based upon, and claims priority to, U.S. Provisional Patent Application Ser. No. 62/210,550, filed Aug. 27, 2015.

STATEMENT REGARDING FEDERALLY SPONSORED RESEARCH OR DEVELOPMENT

Not Applicable.

TECHNICAL FIELD

This invention relates to the extraction of a surfactant from a mixture. In a more specific aspect, this invention relates to a process for the extraction of surfactant from a mixture using a boronic acid modified material.

BACKGROUND OF THE INVENTION

Surfactants (i.e., such as surface-active agents, soaps, wetting agents, dispersants, emulsifiers and detergents) are a multi-billion dollar annual business with applications spanning from household cleaners (such as detergents and hand soaps) to industrial large-scale applications in areas ranging from oil production to pollution control. For the most part, surfactants are produced from inexpensive raw materials by economical methods.

Typically, viewed as a consumable resource, surfactants are disposed after use. However, in recent years, concerns have been raised over the environmental fate of surfactants in wastewater streams. Especially in cases where surfactants are employed to disperse or mix hazardous materials with water, the resulting wastewater stream must be segregated and treated to eliminate the non-aqueous contaminants, such as surfactants. This treatment process can be time and resource intensive.

Accordingly, what is needed is a process whereby a surfactant may be economically and selectively removed from a mixture, such as a wastewater stream.

SUMMARY OF THE INVENTION

Briefly described, the present invention provides a process by which a surfactant is extracted from a mixture containing the surfactant and other components.

After extraction from a mixture, the surfactant can be reused a number of times, including other similar mixtures.

In the process of this invention, the surfactant is extracted from the mixture through use of a boronic acid modified material.

The process of this invention can be used to extract one or more surfactants from the mixture.

Boronic acid has a general structural formula of R—B(OH)$_2$, wherein R is an aryl group having a carbon atom directly linked to the boron atom. The aryl group can contain various substituents, such as formyl. The preferred aryl group is phenyl.

DETAILED DESCRIPTION OF THE INVENTION

The present invention provides a process for the extraction of a surfactant from a mixture through use of a boronic acid modified material to which the surfactant is bound. The bound surfactant is then extracted from the mixture and the modified material.

In a more specific aspect, this invention provides a process for extracting a surfactant from a mixture by (1) producing a boronic acid modified material, (2) optionally adjusting the pH of the mixture to at least 7.0, (3) adding the modified material to the mixture whereby the surfactant binds to the modified material, (4) isolating the surfactant bound boronic acid modified material from the mixture, (5) washing the boronic acid material in an acidic medium (pH of about 1.0 to about 5.0) to release the bound surfactant from the modified material and (6) regenerating the boronic acid modified material for subsequent use through washing.

Isolation of the surfactant bound boronic acid modified material from the mixture can be accomplished by methods known in the art, such as filtration and decanting.

The process of this invention is effective in extracting a surfactant from various mixtures, such as wastewater streams, mixtures from hydraulic fracturing, mixtures from environmental remediation (such as chemical spill cleanups) and machining fluids.

The boronic acid modified material is characterized by a boronate ester linkage formed between a boronic acid and a polyhydroxyl functionalized molecule. Either of these reactants is preferably appended to a solid support, while the other reactant is part of the surfactant.

In the process of this invention, the material which is modified by boronic acid are poly-hydroxyl functionalized and will be homogeneous in solution. The preferred materials are diatomaceous earth and cross-linked polystyrene.

In the process of this invention, a ratio of 5-500 parts surfactant—containing mixture: 1 part boronic acid modified material is preferred.

The ratio is surfactant in the mixture to boronic acid groups on the solid support is preferably close to 1:1. Preferably, the boronic acid is in excess of the surfactant concentration.

The boronate ester linkage may be reversed which will release the surfactant from the solid support to enable reuse of the surfactant.

Surfactants are not easily separated from aqueous mixtures. In general, they are freely soluable in water, thus making precipitation or phase separation difficult. Additionally, surfactants tend to be molecules possessing much higher boiling points than water, which is the principal constituent of the mixture in most cases. Therefore, separation by distillation requires boiling off significant quantities of water to concentrate down the surfactant fraction, which can be very time and energy consuming. To circumvent these barriers, two approaches are used to address waste streams of surfactant-containing mixtures.

The first approach is contingent upon the biodegradability of the surfactant in the mixture. If there is sufficient data describing the environmental fate of the surfactant, in some cases the surfactant can be disposed of as is, provided that the surfactant breaks down to inert materials proven not to cause harm to aqueous environments. For some applications, this can restrict the number of available surfactants.

The second approach may be employed where the surfactant materials are not biodegradable. In this case, ultra-filtration membranes can be used to concentrate the surfactant fraction. These membranes are constructed with pores on the order of submicrons to several nanometers in diameter. Surfactant micelles are blocked by size exclusion, allowing a majority of the aqueous fraction to pass through the filter. Some drawbacks to this approach include the necessity to operate the system under elevated pressures in some cases, as well as a tendency for the membrane pores to become blocked. Blocking of these membranes can require cleaning by use of acids, bases or surfactants, resulting in the generation of secondary waste streams.

In one embodiment, the present invention comprises a process whereby a surfactant containing at least one hydroxyl group is removed from a liquid mixture by filtration through an adsorbent material. The adsorbent material preferably comprises a solid matrix of a different phase from the solution whose particle surfaces are functionalized with boronic acid materials. Separation of the surfactant from the liquid phase is achieved via boronate ester formation between the hydroxyl-containing surfactant molecule and the boronic acid functionality present on the surface of the adsorbent particles. This embodiment includes the reverse process where a bound surfactant can be released from the adsorbent through hydrolysis of the boronate ester linkage, resulting in the recovery and reuse the surfactant.

Of importance to the design of the phenyl boronic acid materials is placing the boronic acid ortho to an amino-methylene unit. Termed Wulff-type binding, this design facilitates boronate ester formation at neutral pH through either direct B—N coordination or via nitrogen activation of a water molecule, which subsequently coordinates with the boronic acid.

The covalent reversible nature of the boronate ester functional group has been widely studied and often exploited for use as a selective bio-sensor platform for sugars, glycoproteins and other poly-hydroxylated molecules of interest. Boronic acid functionalized solid supports have been utilized as a solid matrix in chromatography to separate polyhydroxylated compounds.

In another embodiment, the process of the present invention can be applied to a mixture containing surfactants bearing at least one hydroxyl group, preferably at least two. The surfactant composition may comprise either a single surfactant or a mixture of surfactants. The surfactant mixture may be in various forms, such as a homogenous solution, a biphasic system containing an aqueous phase and lipophilic phase, an emulsified mixture and a colloidal mixture.

Examples of surfactants for extraction by the process of this invention include any number of hydroxyl—containing compounds capable of undergoing condensation with a boronic acid to form a boronate ester linkage, preferably those surfactants possessing multiple hydroxyl groups which can form stable cyclic boronate ester linkages.

Examples of surfactants for binding to the boronic acid modified material in the process of this invention are gylcerol esters of fatty acids, polyglycerol esters of fatty acids, carbohydrate esters of fatty acids, diesters of citric acid with fatty acids and diethanol amines and amides derived from fatty acids and similar long alkyl chains.

The boronic acids used to sequester the surfactant are preferably phenyl boronic acids bearing at least one other functional group that may serve to tether the phenyl boronic acid to a solid support.

Examples of the solid support are any metal oxide (such as silicon dioxide or aluminum oxide), and any mixed-metal oxide capable of undergoing condensation with reactive organo-silicon compounds, commonly referred to as silanes. The silanes are preferably ones possessing functionality, such as amines, halides, aldehydes, esters, anhydrides, alkenes, alkynes and thiols. The functional group of the silane is used to react with the phenyl boronic acid. The phenyl boronic acid functionalized silane is then capable of bonding to the metal oxide solid support, resulting in the boronic acid functionalized solid support. The silane may be reacted with the solid support prior to or after coupling to the boronic acid.

Additional examples of metal oxides and mixed metal oxides useful in the process of this invention are kaolin, montmorillonite, vermiculite, quartz, perlite, diatomaceous earth, silica, cross-linked polymers (such as polystyrene, polyacrylics, polyethylene glycol and latex) and metallic particles (such as gold, silver and iron).

In an other embodiment, the adsorbent comprises a solid support, whose surface is modified with a silane coupling agent, and a phenyl boronic acid moiety appended to the silane. The solid support undergoes a condensation reaction with the silane. The functionality of the silane is selected based on its ability to undergo a reaction with a corresponding phenyl boronic acid molecule. The boronic acid may be reacted with the silane prior to or after condensation with the solid support.

In another embodiment, the silane coupling agent preferably is an amino-functional silane. The silane is hydrolyzed and subsequently subjected to dehydrating conditions in the presence of a metal oxide solid support. The metal oxide may be silicon dioxide, aluminum oxide, mixed metal oxides or any substrate capable of forming stable bonds with the silane coupling agent. The amino-silane is then derivatized with an aldehyde-containing phenyl boronic acid such as 2-formylphenyl boronic acid. The amino-silane and boronic acid are coupled by reductive amination between the amino group and the aldehyde, as seen in FIG. 1.

Figure 1:
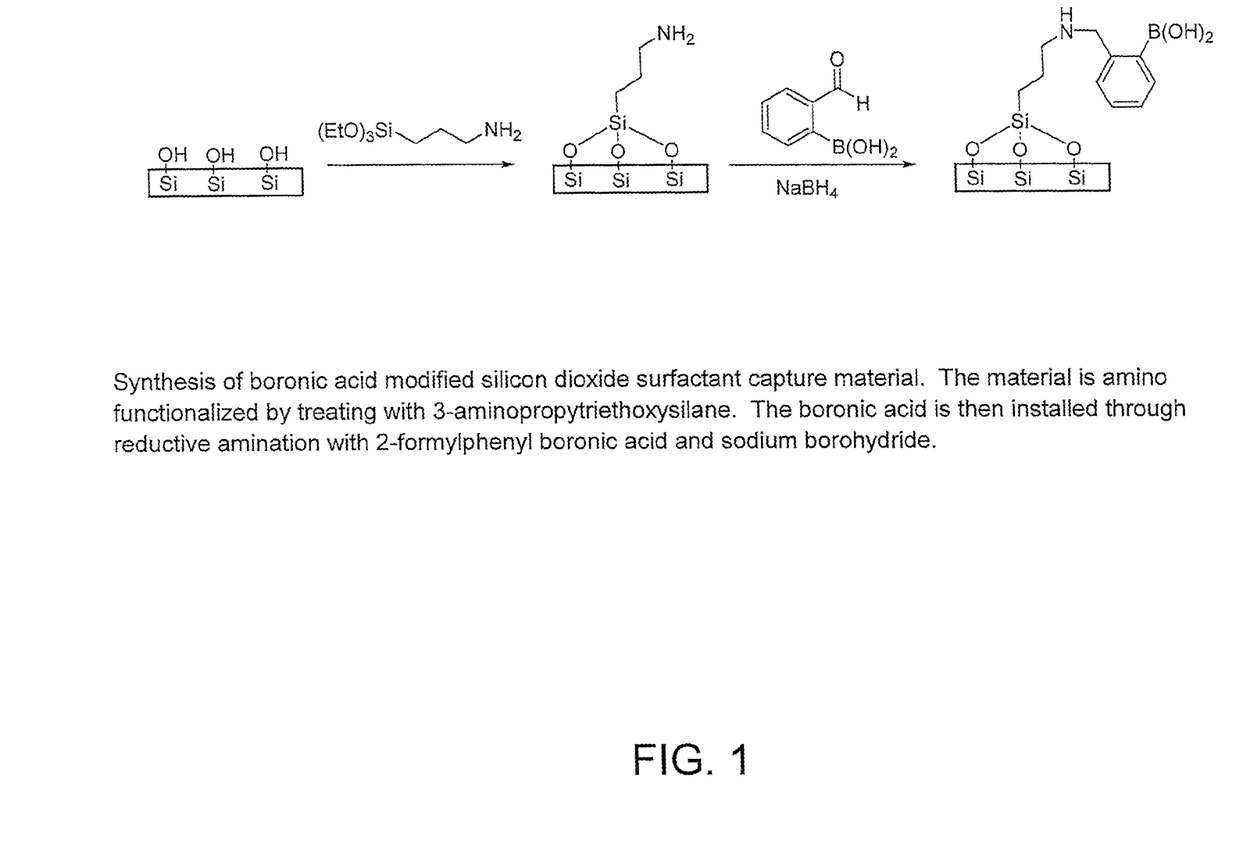
FIG. 1 shows a synthesis in accordance with this invention for the production of boronic acid modified diatomaceous earth (also referred to as SR 14) via 3-aminopropyltriethoxy silane and reductive amination with 2-formylphenyl boronic acid.

In the process shown in FIG. 1, 0.5 g of diatomaceous earth (available commercially under the trademark Celite) in 15 ml. of toluene is stirred with ddH2O (0.16 mL) under argon for 2 hours. To this reaction is added 0.85 ml. of 3-aminopropyltrimethoxysilane (4.87 mmol). The reaction is brought to reflux for 6 hours. The amino modified diatomaceous earth is then washed with toluene, isopropanol and ddH2O, and dried under vacuum. Successful amino modification is confirmed colorimetrically by ninhydrin testing.

Boronic acid modification is achieved by treating amino modified diatomaceous earth with 0.73 g. of 2-formylphenylboronic acid (4.87 mmol) in 9:1 dimethylformamide methanol at 37° C. for 20 hours. To this is added 0.306 g. of sodium cyanoborohydride (4.87 mmol). Gas is evolved for 1 hour before incubating the reaction at 37° C. for 4 hours. Boronic acid modified diatomaceous earth is then washed with dimethyl formamide, methanol and ddH2O and dried under vacuum. Boronic acid modification is determined colorimetrically by alizarin red S testing. Other synthetic embodiments are possible here utilizing different solvent systems (e.g., tetrahydrofuran, toluene, methanol, ethanol, isopropanol) and alternative reducing reagents (e.g., sodium borohydride).

In another embodiment, the silane coupling agent is also an amino-functional silane. However, the silane is first derivatized with an aldehyde-containing phenyl boronic acid such as 2-formyiphenyl boronic acid. The amino-silane and boronic acid are coupled by reductive amination between the amino group and the aldehyde. The resulting boronic acid-functional silane is then hydrolyzed and subsequently subjected to dehydrating conditions in the presence of a metal oxide solid support.

In a further embodiment of this invention, the adsorbent comprises boronic acid modified polystyrene resin. This embodiment utilizes an amino functionalized cross-linked polystyrene. Boronic acids can then be installed through reductive amination between the amino functionalized resin and 2-formylphenyl boronic acid.

Figure 2:
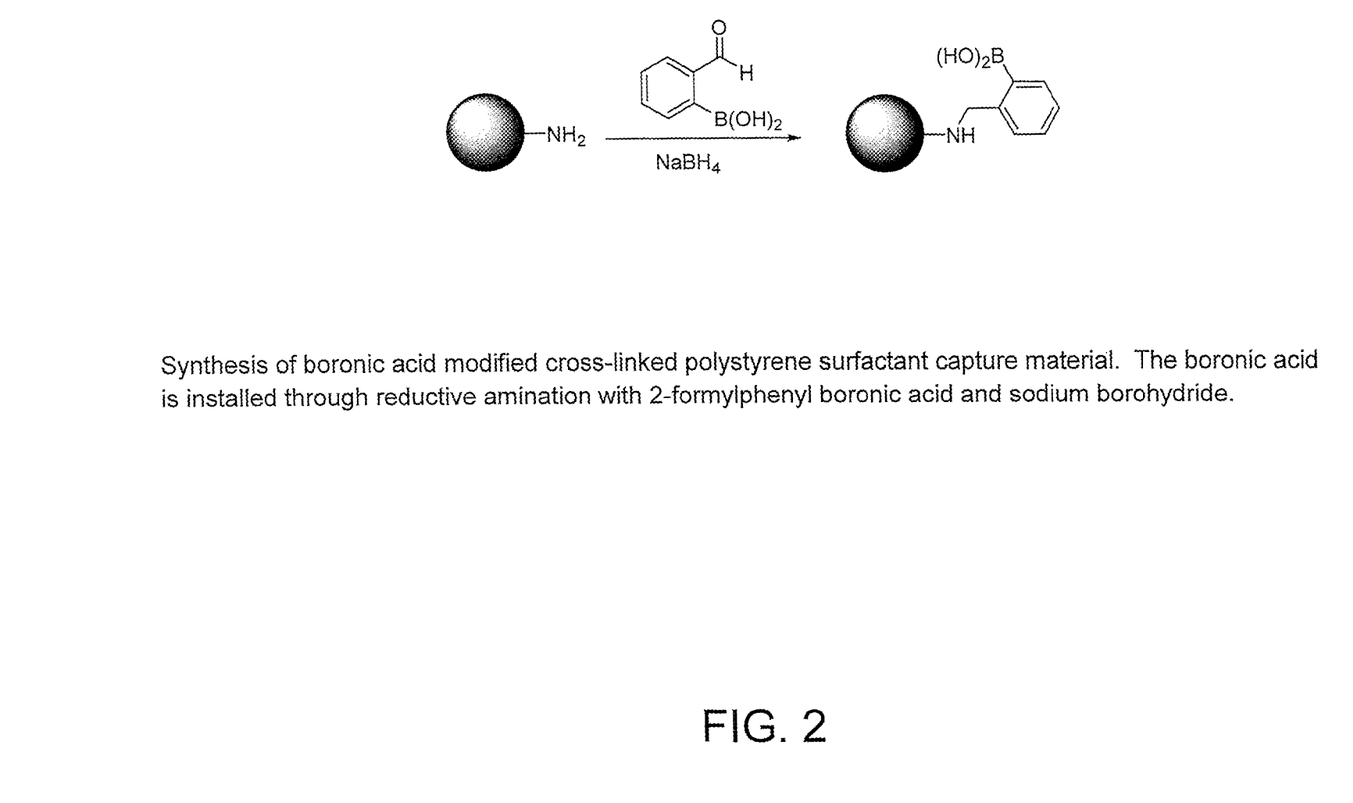
FIG. 2 shows a synthesis in accordance with this invention for the production of boronic acid modified cross-linked polystyrene (also referred to as SR 16) via reductive amination with 2-formylphenyl boronic acid.

In the process shown in FIG. 2, 2 g. of a boronic acid modified polystyrene resin (loading level 3.3 mmol/g) is equilibrated in tetrahydrofuran before being treated with 1.98 g. 2-formylphenyl boronic acid (13.2 mmol; 2 eq.) in tetrahydrofuran at 35° C. for 20 hours. To this is added 0.502 g. sodium borohydride (13.2 mmol). Gas is evolved for 1 hour before incubating the reaction at 37° C. for 4 hours. The boronic acid modified resin, is then washed with dimethyl formamide, methanol and ddH2O and dried under vacuum. Boronic acid modification was determined colorimetrically by alizarin red S testing. Other synthetic embodiments are possible utilizing different solvent systems and alternative reducing reagents.

The solid support may be other polymeric resin particles or metallic particles and the boronic acid moiety may be attached through alternate linkages. The reverse embodiment is also possible, where boronic acid modified surfactants are recovered from solution by polyhydroxylated solid phase particles.

Figure 3:
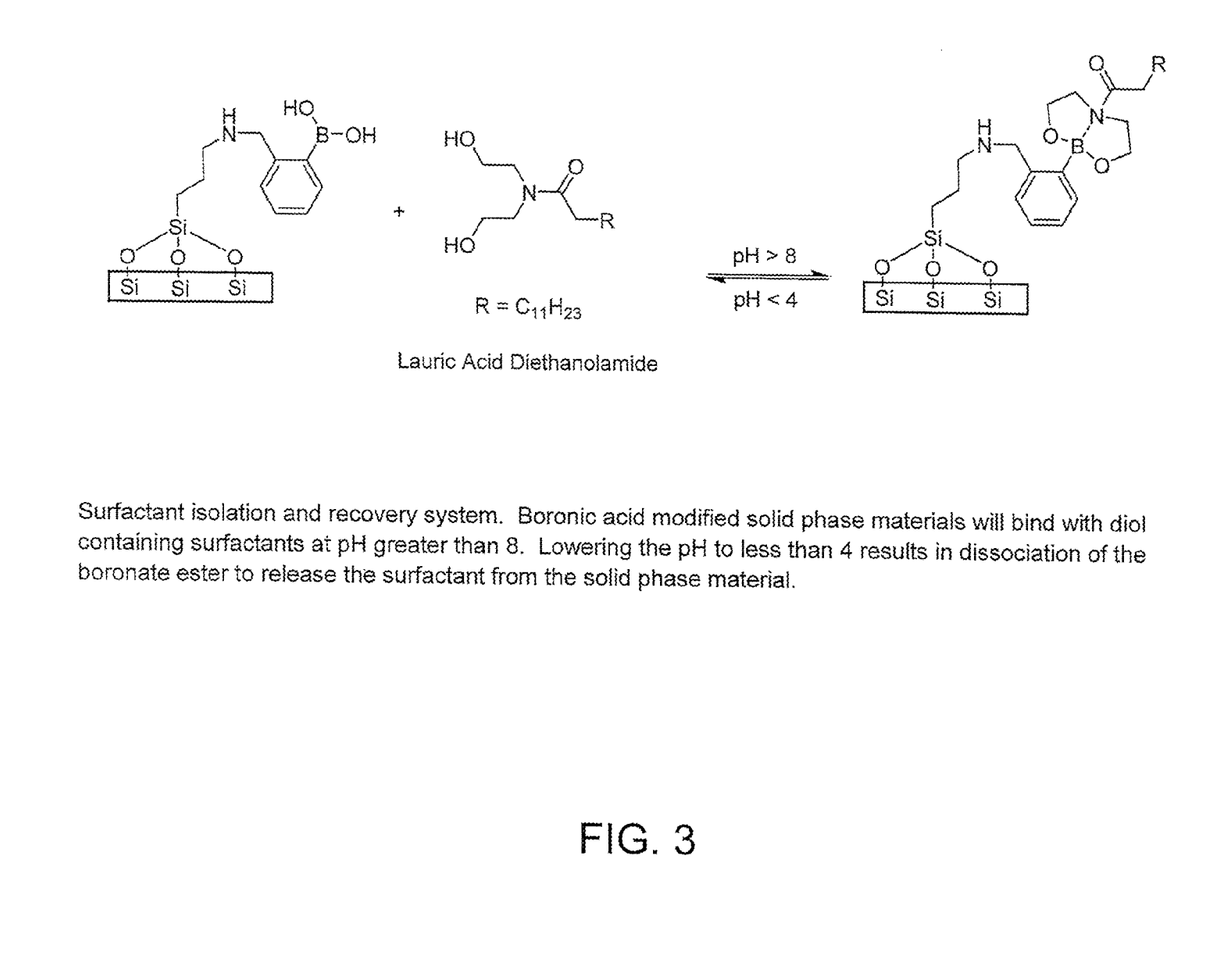
FIG. 3 shows a view of a surfactant isolation and recovery system in accordance with this invention, with pH dependent equilibrium of boronate ester formation between boronic acid modified diatomaceous earth and a diol containing surfactant (lauric acid dilauryl).

As shown in FIG. 3, surfactant isolation and recovery from a boronic acid modified diatomaceous earth is achieved in a pH dependent manner. The mixture containing the surfactant to be extracted is treated with a boronic acid modified solid phase material at a pH greater than 7. At this pH, the equilibrium between boronic acid and a boronate ester favors formation of a boronate ester, effectively appending the diol containing surfactant to the solid phase material. This material can be isolated and transferred to a solution with a pH less than 4. At this pH, the equilibrium favors dissociation of the boronate ester to the free boronic acid and the diol containing surfactant.

Figure 4:
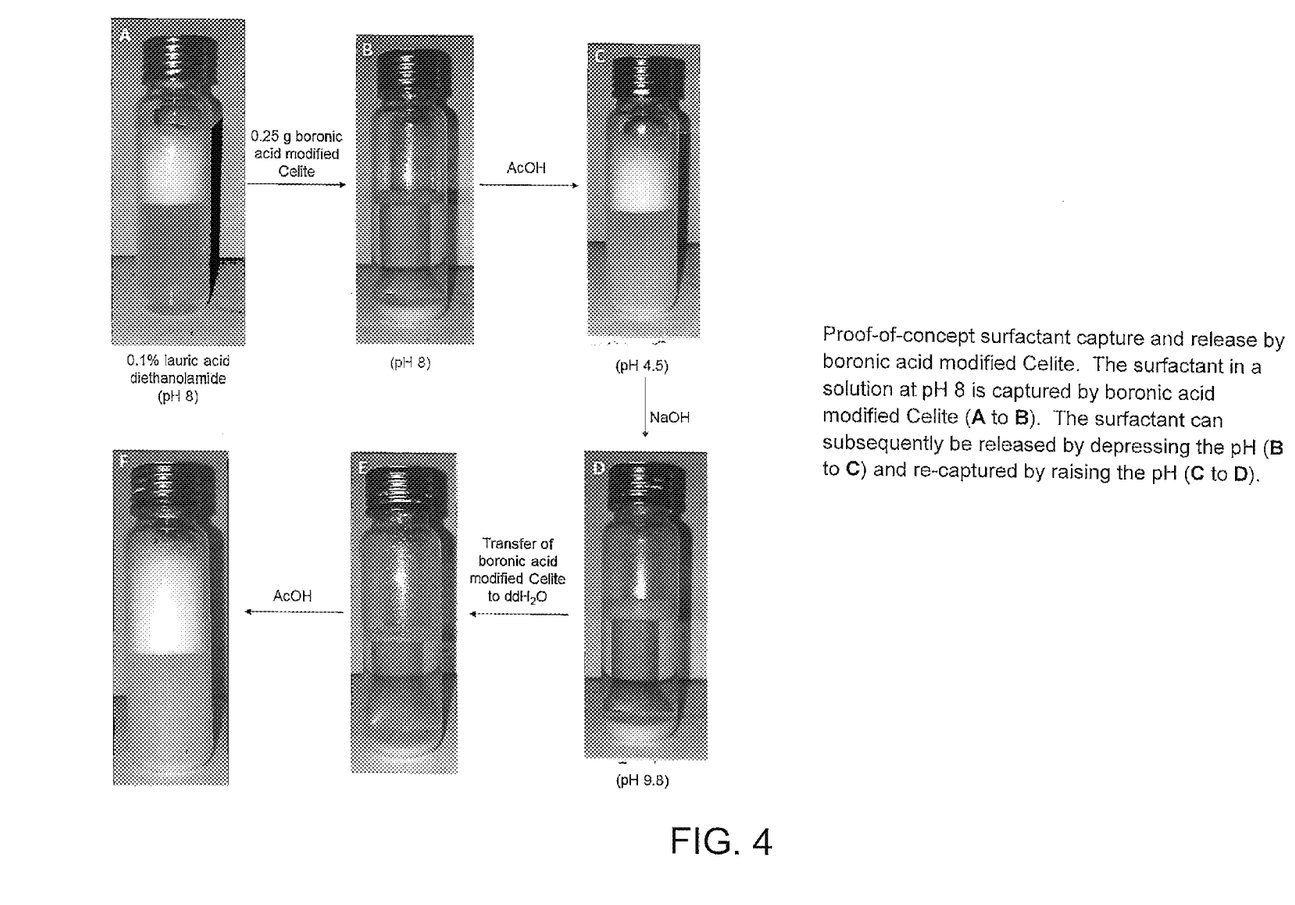
FIG. 4 (A-F) shows views of surfactant capture and release, demonstrating the ability of boronic acid modified to capture and release a diol containing surfactant in solution in response to changes in pH.

As an example of the utility of this system, a solution of 0.1% lauric acid diethanolamide (surfactant) in ddH2O at pH 8 is prepared. Upon agitation, this solution becomes foamy, indicating free dispersion of the surfactant (as seen in FIG. 4A). To this is added 0.25 g. boronic acid modified diatomaceous earth prepared as described above. Within a few minutes, the boronic acid modified material binds the majority of surfactant, indicated by the lack of foam upon agitation (as seen in FIG. 4B). To this mixture is added a small amount of acetic acid, depressing the pH to 4.5 and releasing the surfactant from the capture material. Agitation of this solution produces the predicted foam as a result of the surfactant being free in solution (as seen in FIG. 4C). Adding a small amount of sodium hydroxide (25%) raises the pH to 9.8 and results in binding of the surfactant to the capture system (as seen in FIG. 4D).

To demonstrate the ability to transfer capture surfactant to a different solution, the boronic acid modified diatomaceous earth with captured surfactant is filtered out of solution and transferred to ddH2O (as seen in FIG. 4E). Addition of a small amount of acetic acid depresses the pH and releases the captured surfactant from the solid phase material, resulting in a foamy solution (as seen in FIG. 4F). This work demonstrates the ability to control the capture and release of a diol containing surfactant from a boronic acid modified solid phase material by simple adjustment of pH.

Figure 5:
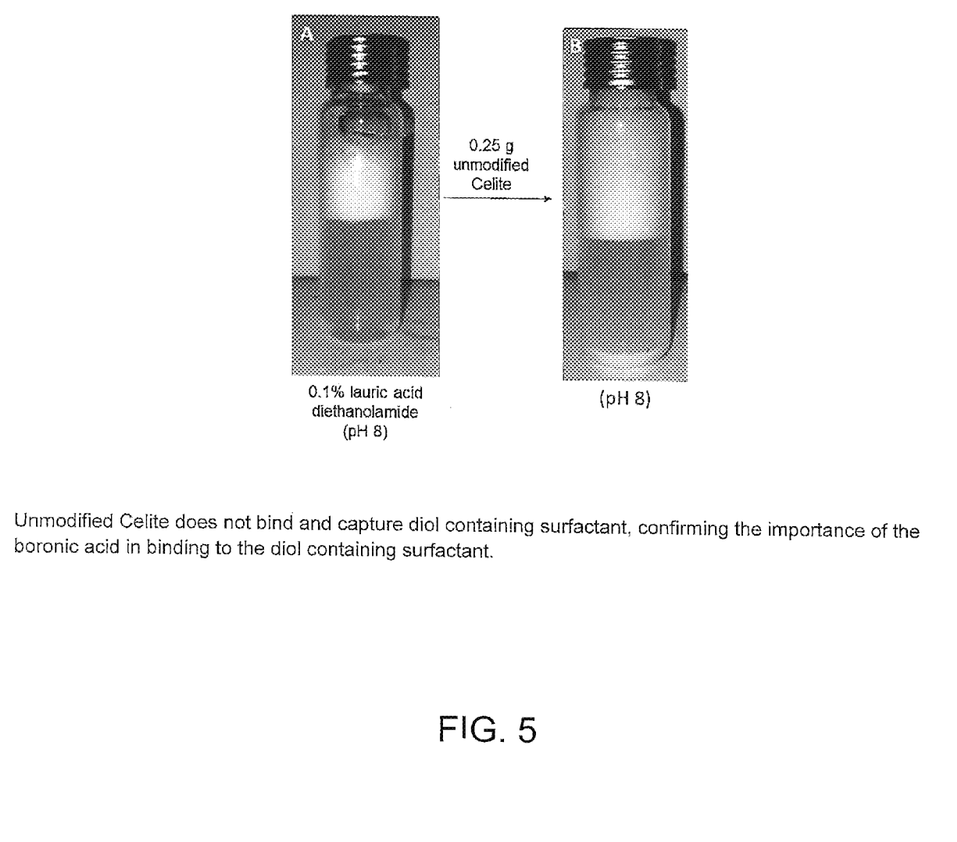
FIG. 5 (A-B) shows a view of control process demonstrating the necessity of the boronic acid modification in capturing diol containing surfactants from solution.

To confirm that the surfactant did not bind to diatomaceous earth that was not boronic acid modified, unmodified diatomaceous earth is also incubated with a solution of 0.1% lauric acid diethanolamide at pH 8. No capture of the surfactant by unmodified diatomaceous earth is observed (as seen in FIG. 5).

Figure 6:
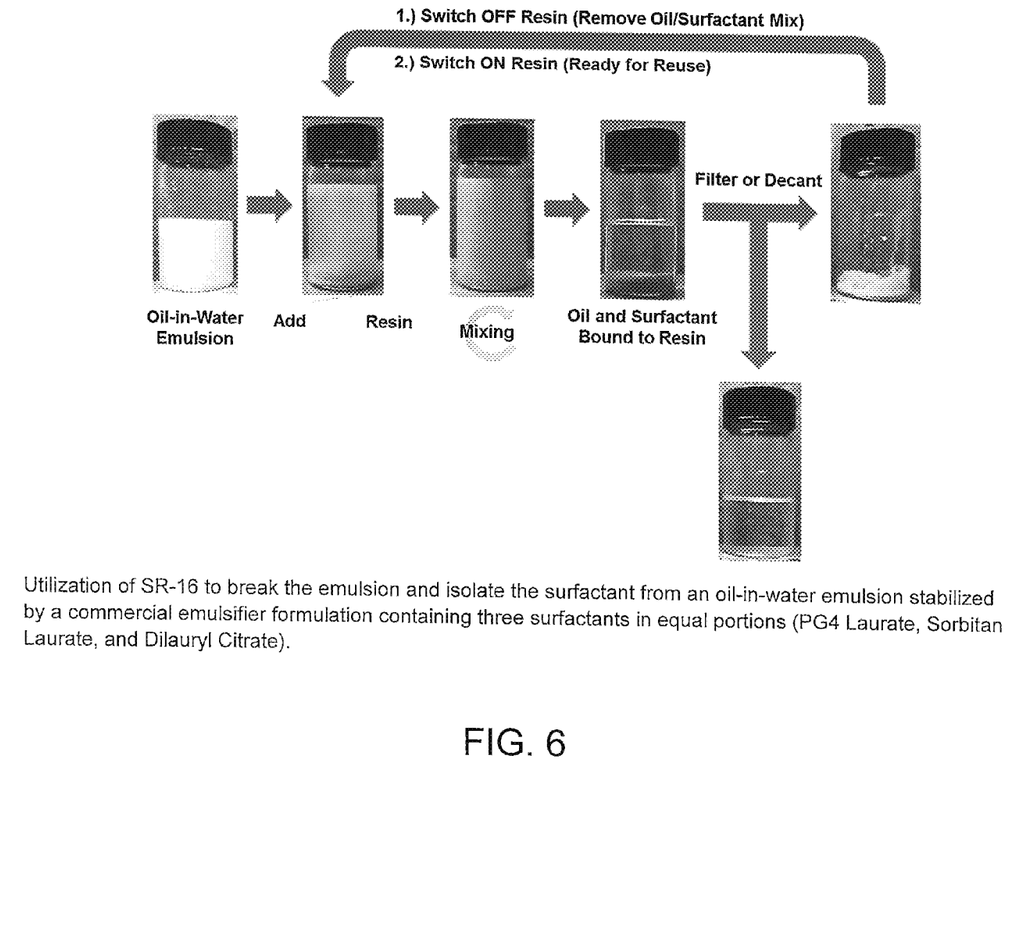
FIG. 6 shows a view of surfactant capture from machining fluid emulsion, demonstrating the ability of boronic acid modified polystyrene to capture diol containing surfactants.

As another example of the utility of the process of this invention, a boronic acid modified polystyrene is used to isolate a surfactant mixture from an oil-in-water emulsion similar to those used in machining fluid applications, as shown in FIG. 6. The emulsion is prepared by first dispersing an emulsifier containing equal quantities of polyglyceryl-4-laurate, sorbitan laurate and dilauryl citrate at 0.25% dilution by weight. To 10 g. of this stock solution of emulsifier is added 0.5 g. mineral oil. This mixture is subjected to high agitation until a homogenous white emulsion is obtained. The boronic acid modified polystyrene resin is added to the emulsion and mixed for approximately 4-8 hours, after which the emulsion is completely clear, with the resin absorbing both the emulsifier and oil components.

Figure 7:
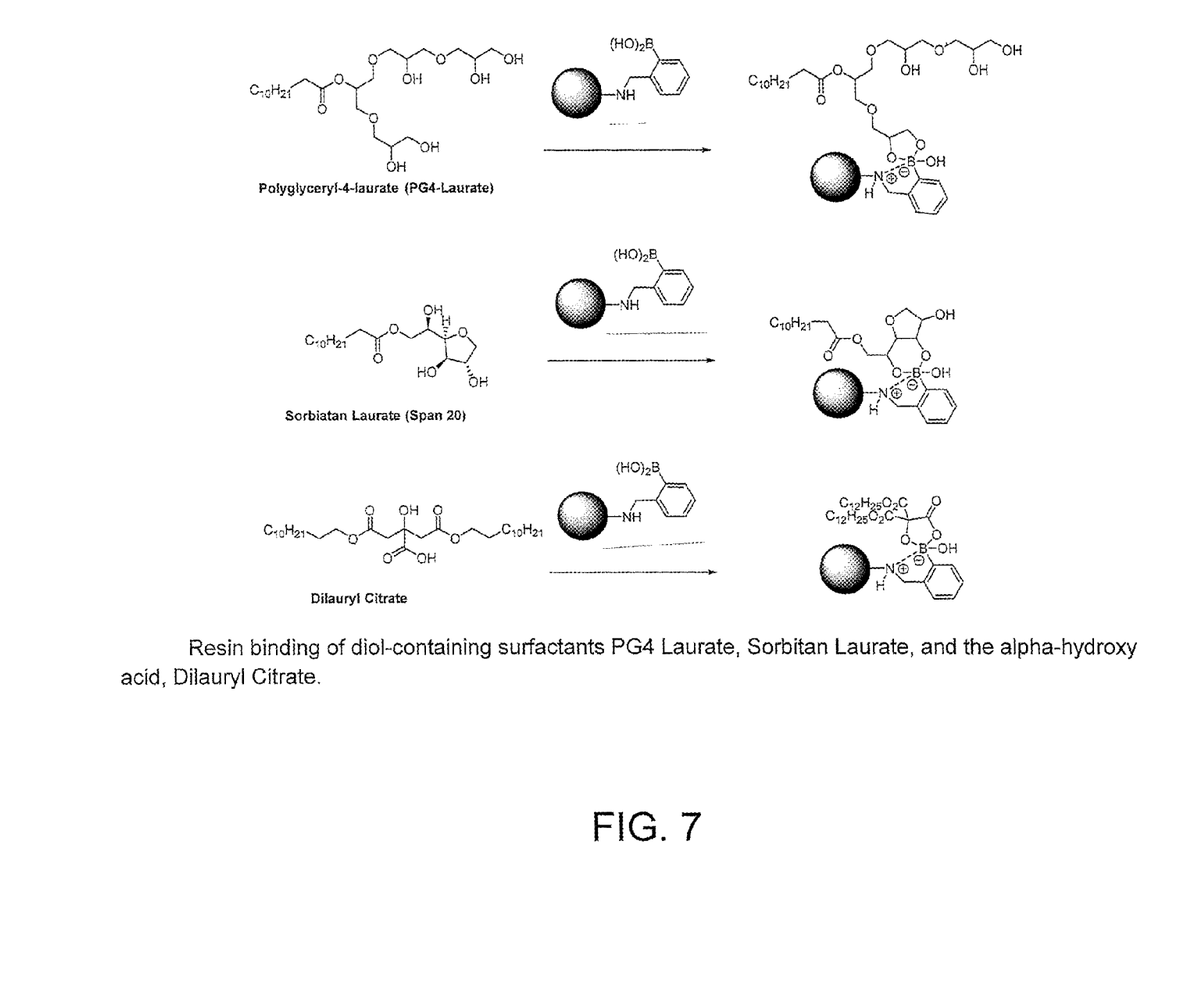
FIG. 7 shows a synthesis in accordance with this invention, with synthesis of N-lauryldopamine, a catechol containing surfactant that is capable of binding much faster and stronger to boronic acid modified materials compared to aliphatic diols.
Figure 8:
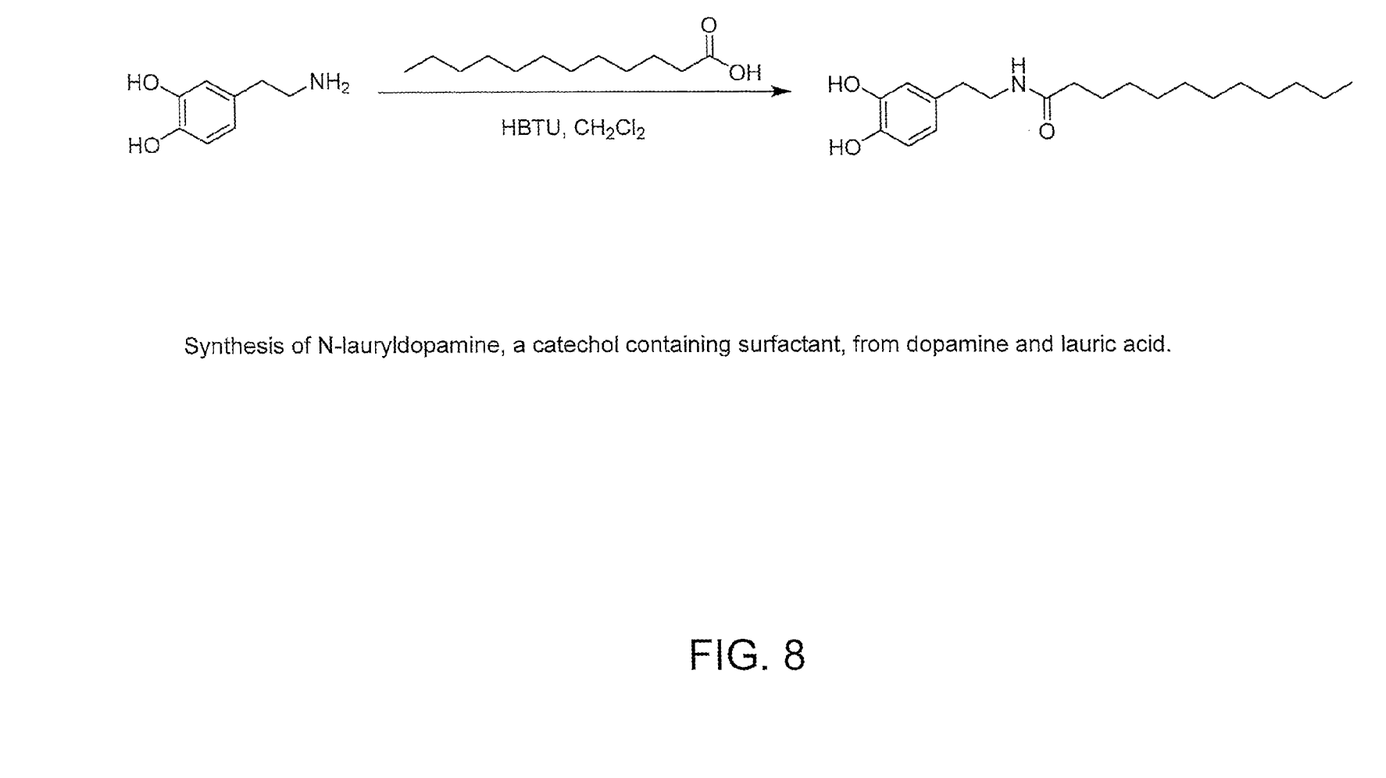
FIG. 8 shows a view of the isolation of three commercial surfactants in accordance with this invention, with pH dependent equilibrium of boronate ester formation between boronic acid modified amino functionalized cross-linked polystyrene and diol-containing surfactants (e.g., polyethylene glycol laurate and sorbitan lautrate), as well as an alpha-hydroxy carboxylate (e.g., diauryl citrate).

A control test is conducted in parallel with an unmodified amino functionalized polystyrene resin. For this sample, the emulsion remains essentially unchanged after the same period of time, indicating that the boronic acid-diol binding is responsible for removal of the surfactant components (FIG. 7). Absorption of the oil fraction is likely due to the inherent hydrophobic nature of the resin matrix in conjunction with the bound surfactant within. Surfactant and oil are then washed out of the resin matrix after removal of the water phase, and then mixing the solid resin four 4 hours with 10 g. isopropanol acidified with 25 mg. acetic acid.

In still another embodiment of this invention, boronic acid modified materials (diatomaceous earth and polystyrene resin) are used to capture a non-commercial catechol containing surfactant. Catechols, which are ortho-hydroxy phenols, bind much stronger to boronic acids than aliphatic diols. As such, catechol containing surfactants would bind much faster and stronger to the boronic acid modified materials described in this application.

Thus, this invention also comprises the synthesis and use of catechol containing surfactants for the purpose of binding to boronic acid modified materials during the above described surfactant sequestration uses. One example of a catechol containing surfactant, N-lauryldopamine, is shown in FIG. 7. Briefly, lauric acid is activated with N,N,N',N'-tetramethyl-O-(1H-benzotriazol-1-yl)uronium hexafluorophosphate, 0-(benzotriazol-1-yl)-N,N,N',N'-tetramethyluronium hexafluorophosphate in dichloromethane for 30 minutes at room temperature. This solution is cooled on ice and added slowly to a solution of cooled dopamine in dichloromethane. The resulting compound, N-lauryldopamine, is concentrated in vacuo and purified by column chromatography.

Although double distilled $H_2O$ is used in the above description, water that is not double distilled and other compatible polar solvents can be used in the process of this invention.

This invention has been described with particular reference to certain embodiments, but variations and modifications can be made without departing from the spirit and scope of this invention.

The invention claimed is:

1. A process for extracting a surfactant from a mixture containing at least one surfactant having at least one hydroxyl group, wherein the process comprises the steps of:
   A. providing a boronic acid modified material;
   B. optionally adjusting the pH of the mixture to at least 7.0;
   C. adding the boronic acid modified material to the mixture whereby the surfactant binds to the boronic acid modified material;
   D. isolating the surfactant bound boronic acid modified material from the mixture;
   E. washing the boronic acid modified material in an acidic medium thereby releasing the bound surfactant from the modified material; and
   F. regenerating the boronic acid modified material for subsequent use through washing.

2. The process as defined in claim 1 wherein the boronic acid modified material is diatomaceous earth modified with a boronic acid.

3. The process as defined in claim 2 wherein the boronic acid is phenyl boronic acid.

4. The process as defined in claim 1 wherein the boronic acid modified material is polystyrene modified with a boronic acid.

5. The process as defined in claim 4 wherein the boronic acid is phenyl boronic acid.

6. The process as defined in claim 1 wherein the mixture is a wastewater stream, a mixture from hydraulic fracturing, a mixture from environmental remediation or machining fluids.

7. The process as defined in claim 1 wherein the boronic acid has a structural formula of $R-B(OH)_2$, wherein the R group has a carbon atom directly attached to the boron atom.

8. The process as defined in claim 1 wherein the boronic acid is phenyl boronic acid.

9. The process as defined in claim 1 wherein the boronic acid is formyl phenyl boronic acid.

10. The process as defined in claim 1 wherein in step B the pH is adjusted to at least 7.0; and in step E the acidic medium contains acetic acid.

11. The process as defined in claim 1 wherein the surfactant is a glycerol ester of a fatty acid, a polyglycerol ester of a fatty acid, a carbohydrate ester of a fatty acid, a diester of citric acid with fatty alcololols, a diethanol amine derived from a fatty acid or a diethanol amide derived from a fatty acid.

12. The process as defined in claim 1 wherein the ratio of surfactant mixture to the modified material is 5-500 parts: 1 part.

13. The process as defined in claim 1 wherein in step B the pH is adjusted to at least 7.0, and the adjustment is by adding sodium hydroxide.

14. The process as defined in claim 13, wherein step E the acidic medium contains acetic acid.

* * * * *